United States Patent Office 3,356,531
Patented Dec. 5, 1967

3,356,531
STABILIZATION OF PASTED STARCH
Robert E. Lanphere, Camanche, Iowa, assignor to Standard Brands Incorporated, New York, N.Y., a corporation of Delaware
No Drawing. Filed July 30, 1964, Ser. No. 386,410
6 Claims. (Cl. 127—33)

This invention relates to a method of stabilizing pasted starch and to the resulting product. More particularly, the invention relates to a novel method of preparing starch grits or starch pellets.

When pasted starch is allowed to stand, changes take place in the starch, the nature and causes of which are not known. The changes are accompanied by a change in the pH of the starch slurry. A result of the change is a reduction in the adhesive or cementing properties of the swollen starch granules, which reduction becomes greater as time goes on.

An object of the invention is to provide a stabilized pasted starch and a method of stabilizing pasted starch. A further object of the invention is an improvement in the known method of preparing starch grits which involves combining a major proportion of ungelatinized starch granules and a minor proportion of gelatinized starch granules.

In accordance with the present invention, it has been found that if a small amount of hydrogen peroxide is included in pasted starch, the pasted starch may be held for long periods and will not undergo substantial change. This process is useful, for instance, in the production of starch grits by the method described in Schwandt Patent 2,929,748. According to this method, an aqueous slurry of ungelatinized starch granules is heated to produce a dispersion of gelatinized starch, the dispersion is mixed with a relatively large proportion of unheated or ungelatinized starch slurry, the blend is filtered to obtain a wet filter cake and the cake is dried. A disadvantage of this process is the fact that the gelatinized starch begins to undergo changes within a short period of time which reduce the hardness of the finished product. These changes are prevented in the present invention by providing a small proportion of hydrogen peroxide in the blend.

To produce starch grits in accordance with the present invention, the procedure described in Schwandt Patent 2,929,748 may be followed and in addition hydrogen peroxide is provided in the blend of gelatinized and ungelatinized starch. The disclosure in that patent is to be considered as incorporated by reference in the present application. As indicated in the patent, the blend of gelatinized starch and ungelatinized starch may be prepared by heating a water slurry of starch granules to a temperature within the range of about 150° F. to about 180° F., and mixing the resulting dispersion with a second water slurry of starch granules, the temperature of the second slurry being less than 150° F., and the ratio of starch dry substance in the slurry which is heated to that of the second slurry ranging from about 0.05 to about 0.25.

It is preferable to provide hydrogen peroxide in both of the starch slurries before mixing, although it may be added to either slurry or to the blend formed from the two slurries. A very small amount of hydrogen peroxide is adequate, although larger amounts, up to about 0.14 percent based on the dry substance starch, may be used. For reasons of economy, a minimum is preferred amounting to about 0.035 percent based on the dry substance starch. In the prior art processes, like that of the Schwandt patent, the blends had to be sufficiently small to allow complete processing in a comparatively short time in order to assure uniform hardness of the finished product. On the other hand, batches made in accordance with the present invention, utilizing hydrogen peroxide, are limited in size only by the capacity of the equipment available. For example, batches have been held for as long as 24 hours without causing a noticeable reduction in the hardness of the grits prepared therefrom.

Hydrogen peroxide has been used as an oxidizing agent in the preparation of certain oxidized starches. In such processes, the amount of hydrogen peroxide is large enough to increase the fluidity of the starch and produce a softer, more friable product. In the present invention, on the other hand, the amount of hydrogen peroxide employed is very small and not sufficient to significantly affect the fluidity of the starch.

In order more clearly to disclose the nature of the present invention, specific examples will hereinafter be described. It should be understood, however, that this is done solely by way of example and is intended neither to delineate the scope of the invention nor limit the ambit of the appended claims. In the examples and throughout this specification percentages are intended to refer to percent by weight, unless otherwise specified.

EXAMPLE I 62,411 lbs, dry substance slightly acid-modified corn starch in a water slurry was adjusted to 37.85% dry substance, 6.6 pH and 110° F. 62.4 lbs. (0.1% based on the dry substance starch) of 35% hydrogen peroxide was added to the starch slurry. Another tank of 5,427 lbs. dry substance native corn starch in a water slurry was adjusted to 8.885% dry substance and 6.3 pH. 5.4 lbs. (0.1% based on the dry substance starch) of 35% hydrogen peroxide was added to this starch slurry. The second starch slurry was then heated to 164° F. by steam injection and added to the first starch slurry. The mixture was blended thoroughly and then filtered. The filter cake was dried in the conventional manner. The filtering and drying was a continuous operation requiring about 6 hours, the filter cake being transferred as it was produced to the belt of a Proctor and Schwartz continuous horizontal moving belt drier. The dried product was then crushed and screened to yield grits of the desired size. The finished product was of uniform hardness, averaged only 4.7% fines, and had an average attrition value of 4.1%.

Percent fines was determined by hand shaking 100 gms. of starch grits on a #10 Tyler Standard sieve, weighing the starch that passes through the screen, and expressing that weight as percent fines.

Percent attrition was determined by (1) weighing out 50 gms. of the starch grits retained on the #10 sieve, (2) placing the 50 gms. of starch in a pint size shell of the Patterson Kelly Twin Shell Dry Blender, (3) adding 6 glass marbles of 1" diameter, (4) rotating for exactly 15 minutes, (5) hand shaking upon a #10 sieve, (6) multiplying the weight of starch (in grams) that passes through the sieve by 2, (7) expressing this value as percent attrition.

EXAMPLE II

The procedure of Example I was repeated except that the additions of hydrogen peroxide were omitted. The product obtained from the first half of the batch had an average fines content of 5.1% and an average attrition value of 5.1%, while the product from the last half of the batch had an average fines content of 13.1% and an average attrition of 25.7%.

EXAMPLE III 3470 ml. of a native corn starch slurry was adjusted to 37.31% dry substance and 6.0 pH and heated to 125° F. 2185 ml. of a second native corn starch slurry with a calculated 7.99% dry substance was heated to 165° F. and the resulting dispersion was added to the first slurry. The mixture was mixed for 30 minutes to assure uniformity of the blend. A part of the blend was filtered immediately and then dried in a laboratory Proctor and Schwartz oven. The dried product had a fines content of 4% and an attrition value of 3%.

The balance of the blend was held in a 125° F. constant temperature bath (with agitation) for 12 hours. After 12 hours it was filtered and dried. The dried product had a fines content of 25% and an attrition value of 92%.

EXAMPLE IV

The procedure of Example III was repeated with one addition. As soon as the components of the blend were mixed together 1.68 grams of 35% hydrogen peroxide was added to the mixture. After mixing for 30 minutes a part of the blend was filtered and then dried in a laboratory Proctor and Schwartz oven. The dried product had a fines content of 5% and an attrition value of 4%.

The balance of the blend was held in a 125° F. constant temperature bath (with agitation) for 12 hours. After the 12 hour period, it was filtered and dried. The dried product had a fines content of 5% and an attrition value of 6%.

The invention is applicable to starch granules in general, including both native and modified starches. The latter includes oxidized, acid-treated, heat-treated, and pressure-modified starches. Nor is the invention limited to highly purified starches. It is applicable to starch slurries containing substantial proportions of foreign material such as gluten.

The terms and expressions which have been employed are used as terms of description and not of limitation, and it is not intended, in the use of such terms and expressions, to exclude any equivalents of the features shown and described or portions thereof, since it is recognized that various modifications are possible within the scope of the invention claimed.

What is claimed is:
1. A process of stabilizing a pasted starch dispersion which comprises providing therein a small amount of hydrogen peroxide effective to prevent substantial reduction in the cementing properties of the starch on standing but insufficient to substantially affect the fluidity of said dispersion.

2. A process as defined in claim 1 wherein the amount of hydrogen peroxide is within the range from about 0.035 percent to about 0.14 percent based on the dry substance starch.

3. A composition comprising a pasted starch dispersion and a small amount of hydrogen peroxide effective to prevent substantial reduction on standing of the cementing properties of the starch but insufficient to substantially affect the fluidity of said dispersion.

4. A composition as defined in claim 3 wherein the amount of hydrogen peroxide is within the range of about 0.035 percent to about 0.14 percent based on the dry substance starch.

5. In a process of producing starch grits which comprises heating a water slurry of starch granules to a temperature within the range of about 150° F. to about 180° F., mixing the resulting dispersion with a second water slurry of starch granules, the temperature of the second slurry being less than 150° F., the ratio of starch dry substance in the heated slurry to that of the second slurry ranging from about 0.05 to about 0.25, dewatering the blend to obtain a wet starch cake, and drying said cake to obtain grits, the improvement which comprises providing a small amount of hydrogen peroxide in the blend effective to substantially prevent a reduction on standing of the cementing action of the gelatinized starch but insufficient to substantially affect the fluidity of the dispersion.

6. A process as defined in claim 5 wherein the amount of hydrogen peroxide is within the range of about 0.035 percent to about 0.14 percent based on the dry substance starch.

References Cited

UNITED STATES PATENTS

| | | | |
|---|---|---|---|
| 2,218,221 | 10/1940 | Schopmeyer et al. | 127—70 |
| 2,777,749 | 1/1957 | Young | 127—70 X |
| 2,929,748 | 3/1960 | Schwandt | 127—71 |

JOSEPH SCOVRONEK, Primary Examiner.

MORRIS O. WOLK, Acting Examiner.

E. G. WHITBY, Assistant Examiner.